Sept. 12, 1939.    J. D. SPALDING    2,172,777
ROTARY MACHINE
Original Filed March 1, 1937

Inventor
John D. Spalding
By Lyon & Lyon
Attorneys

Patented Sept. 12, 1939

2,172,777

UNITED STATES PATENT OFFICE 2,172,777

ROTARY MACHINE

John D. Spalding, Los Angeles, Calif., assignor to The National Supply Company, Pittsburgh, Pa., a corporation of Pennsylvania Original application March 1, 1937, Serial No. 128,468. Divided and this application February 7, 1938, Serial No. 189,054

8 Claims. (Cl. 308—230)

This invention relates to rotary machines of the type used in the drilling of wells, and is more particularly related to a rotary machine of the enclosed type constructed to meet the present demands of deep drilling operations.

An object of my invention is to provide a bearing mounting for the table of a rotary machine, in which mounting an upthrust bearing is positioned between the base and table skirt within a lubricant chamber, and in which a flange is provided which overhangs a portion of the bearing to prevent escape of lubricant from the chamber.

Another object of this invention is to provide a rotary machine in which there is provided means for maintaining proper bearing lubrication and wherein the lubrication is made effective to the upthrust bearing in such a manner as to prevent escape of lubricant on rotation of the table.

Other objects and advantages of this invention it is believed will be apparent from the following detailed description of a preferred embodiment thereof as illustrated in the accompanying drawing.

Figure 1:
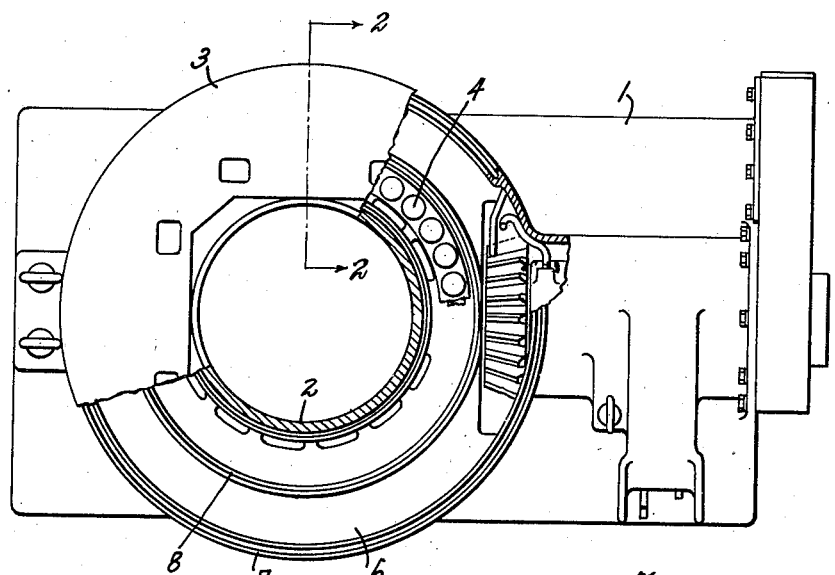
Figure 1 is a plan view partly in horizontal section of a rotary machine in which my invention is embodied.
Figure 2:
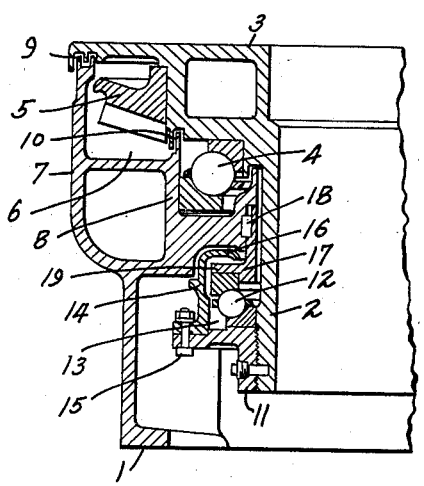
Figure 2 is a sectional view taken substantially on the line 2—2 of Figure 1.

The invention of this application is the sole invention of this applicant and is divided out of the copending application of Morgan and Spalding, Serial No. 128,468, filed March 1, 1937, for Rotary machine.

In the rotary machine in which my invention is incorporated, the base 1 has a central bore through which the annular skirt 2 of the rotary table 3 extends. An anti-friction bearing 4 supports the table 3 upon the base 1. A ring gear 5 is carried by the table 3 which operates within the annular enclosure 6 formed by the upstanding rim 7 of the base 1 and an inner annular rim 8 likewise formed on the base 1.

The top of the chamber 6 is closed by the table which forms a labyrinth seal 9 with the rim 7 and a labyrinth seal 10 with the rim 8 so as to exclude foreign matter from, and retain the lubricant, within the annular chamber. The labyrinth seals 9 and 10 may be of any suitable or desirable types such, for example, as illustrated in Patent No. 2,008,774 to John D. Spalding.

An upthrust ring 11 is removably secured to the lower end of the annular skirt 2 and supports an anti-friction upthrust bearing 12. The bearing 12 is maintained in an annular chamber 13 formed between the ring 11 and the annular skirt 2. The bearings 4 and 12 cooperate to maintain the rotary machine in alignment upon the base 1 to hold the table to strictly concentric rotation with relation to the base 1.

On the upthrust ring 11 is formed an outer annular wall 14 which surrounds the bearing 12. The outer annular wall 14 may be, as indicated, formed as a part separate from the ring 11 and be secured to the ring 11 by means of bolts 15. The wall as thus formed forms a lubricant retaining member and is provided at its upper end with an inwardly extending and downwardly lipped flange 16.

In the construction of rotary machine as illustrated, the upper bearing race support 17 is pressed into the base 1 and is held from rotation with relation to the base 1 by means of a key 18. The flange 16 extends between the outwardly extending flange 19 of the race supporting member 17 and the base 1. The ring 11 and lubricant retaining member 14 rotate with the table 3 and therefore escape of lubricant from the chamber 13 would require that the lubricant within the chamber 13 make its way to the top of the inner wall of the retainer 14 and then pass inwardly against the action of centrifugal force and under the lipped flange 16. The chamber 13 and retainer 14 are so proportioned as to provide adequate space within the chamber 13 to accommodate the entire volume of upthrust bearing lubricant required when acted upon by centrifugal force.

The construction as thus described is particularly effective in preventing the loss of lubricant and at the same time affords an easy assembly of the required parts. Lubricant may be introduced into the chamber 13 through the use of any suitable or desirable means and may be introduced for example in any of the manners indicated in the copending application of Morgan and Spalding, Serial No. 128,468, heretofore referred to.

Having fully described my invention, it is to be understood that I do not wish to be limited to the details herein set forth, but my invention is of the full scope of the appended claims.

I claim:

1. In a rotary machine, a base having a central opening, a table having a central depending skirt extending into said opening, a bearing carried by the base for rotatably supporting said table, a ring secured to said skirt, upthrust bearing means positioned between said ring and said base to resist upward movement of the table, an annular upwardly extending wall detachably carried on said ring and surrounding said bearing means to form an annular lubricant reservoir, said wall having an annular inwardly extending flange overhanging a portion of said upthrust bearing means, and adapted to confine the lubricant in said reservoir upon rotation of said table.

2. In a rotary machine, a base having a central opening, a table having a central depending skirt extending into said opening, a bearing carried by the base for rotatably supporting said table, a ring secured to said skirt, upthrust bearing means, including an upper race ring, positioned between said ring and said base to resist upward movement of the table, an annular upwardly extending wall detachably carried on said ring and surrounding said bearing means to form a lubricant reservoir, said wall having an annular inwardly extending flange overhanging a portion of said upper race ring and adapted to confine the lubricant in said reservoir upon rotation of said table.

3. In a rotary machine, a base having a central opening, a table having a centrally depending skirt extending into said opening, a bearing carried by the base for rotatably supporting the table, a ring secured to the lower end of the skirt, an upthrust bearing carried between the ring and the said base to resist upward movement of the table, a lubricant retainer carried by the ring and forming a chamber between the ring, retainer and skirt in which the upthrust bearing is situated, said retainer having an inwardly extending downwardly lipped flange to confine lubricant within said chamber against the effect of centrifugal force imposed upon the lubricant contained within said chamber as the table rotates.

4. In a rotary machine, a base having a central opening, a table having a centrally depending skirt extending into said opening, a bearing carried by the base for rotatably supporting the table, a closure member secured to the lower end of the skirt to define an annular chamber near the lower end of the skirt, said closure member including an inwardly extending annular flange at the upper end of said chamber, and upthrust bearing means positioned within said chamber between a portion of the base and the closure member.

5. In a rotary machine, a base having a central opening, a table having a centrally depending skirt extending into said opening, a bearing carried by the base for rotatably supporting said table, a closure member secured to the lower end of the skirt and defining with the skirt an annular chamber, said closure member including an inwardly extending annular flange defining the upper limit of said chamber, a bearing supported within the chamber, and means extending from the base into said chamber providing a race support for said bearing.

6. In a device of the class described, the combination of a stationary member, a rotary member, a bearing carried by the stationary member and adapted to rotatably support the rotary member, upthrust bearing means comprising a pair of races having roller elements positioned therebetween, one of said races being supported upon the rotary member and the other of said races engaging the stationary member, whereby relative upward movement of the rotary member may be resisted, an annular wall on the rotary member surrounding the upthrust bearing means to form the outer boundary of a lubricant chamber, an annular inwardly extending flange on said wall overhanging a portion of the last mentioned bearing race, and adapted to confine lubricant within said chamber against the effect of centrifugal force incident to rotation of the rotary member.

7. In a rotary machine, the combination of a base having a central opening, a table having a central depending skirt extending into said opening, a bearing carried by the base for rotatably supporting said table, a ring secured to said skirt, a bearing support on said base, upthrust bearing means positioned between said ring and said bearing support to resist upward movement of the table, side bearing means including a pair of race rings having roller elements positioned therebetween an annular upwardly extending wall detachably carried on said ring and surrounding said bearing means to form a lubricant reservoir, said wall having an annular inwardly extending flange overhanging a portion of the race ring adjacent the bearing support, and adapted to confine the lubricant in said reservoir against the action of centrifugal force.

8. In a rotary machine, the combination of a base having a central opening, a table having a central depending skirt extending into said opening, a table bearing carried by the base for rotatably supporting said table, an annular ring removably secured upon said skirt, upthrust bearing means interposed between said annular ring and said base whereby relative upward movement of the table may be resisted, said upthrust bearing means including a pair of races having roller elements disposed therebetween, aligning means carried by the base adapted to engage the upper race on its inner periphery whereby said race may be maintained in a central position, an annular wall on said ring surrounding said bearing means and cooperating with said skirt and ring to form an annular lubricant chamber, and an annular inwardly extending flange on said wall overhanging a portion of said upper bearing race, and adapted to confine lubricant within said chamber against the action of centrifugal force.

JOHN D. SPALDING.